United States Patent
Isozaki

(10) Patent No.: US 7,123,713 B2
(45) Date of Patent: Oct. 17, 2006

(54) COMMUNICATION DEVICE

(75) Inventor: Atsushi Isozaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 45 days.

(21) Appl. No.: 10/926,963

(22) Filed: Aug. 27, 2004

(65) Prior Publication Data

US 2005/0069124 A1 Mar. 31, 2005

(30) Foreign Application Priority Data

Sep. 30, 2003 (JP) ............................ 2003-342209

(51) Int. Cl.
*H04M 1/2745* (2006.01)
(52) U.S. Cl. ..................... 379/355.02; 379/355.09; 358/440; 455/564
(58) Field of Classification Search ............................... 379/355.02–355.03, 355.09
See application file for complete search history.

(56) References Cited

U.S. PATENT DOCUMENTS 6,185,295 B1 * 2/2001 Frederiksen et al. ... 379/355.05
6,243,459 B1 * 6/2001 Cannon et al. ........ 379/356.01
6,295,355 B1 * 9/2001 O'Neal et al. ......... 379/355.05
6,728,558 B1 * 4/2004 Kubo et al. .................. 455/564
6,760,431 B1 * 7/2004 Haimi-Cohen ......... 379/355.02

FOREIGN PATENT DOCUMENTS

JP U 4-78849 7/1992

* cited by examiner

Primary Examiner—Daniel Swerdlow
(74) Attorney, Agent, or Firm—Oliff & Berridge, PLC

(57) ABSTRACT

A communication device making a call origination in accordance with a predetermined operation is provided with a one-touch dial storage that stores telephone numbers in association with one-touch dial keys, a telephone directory data storage that stores telephone numbers which are not associated with one-touch dial keys, and a copying system that copies at least the telephone number stored in the one-touch dial storage into the telephone directory data storage.

21 Claims, 12 Drawing Sheets

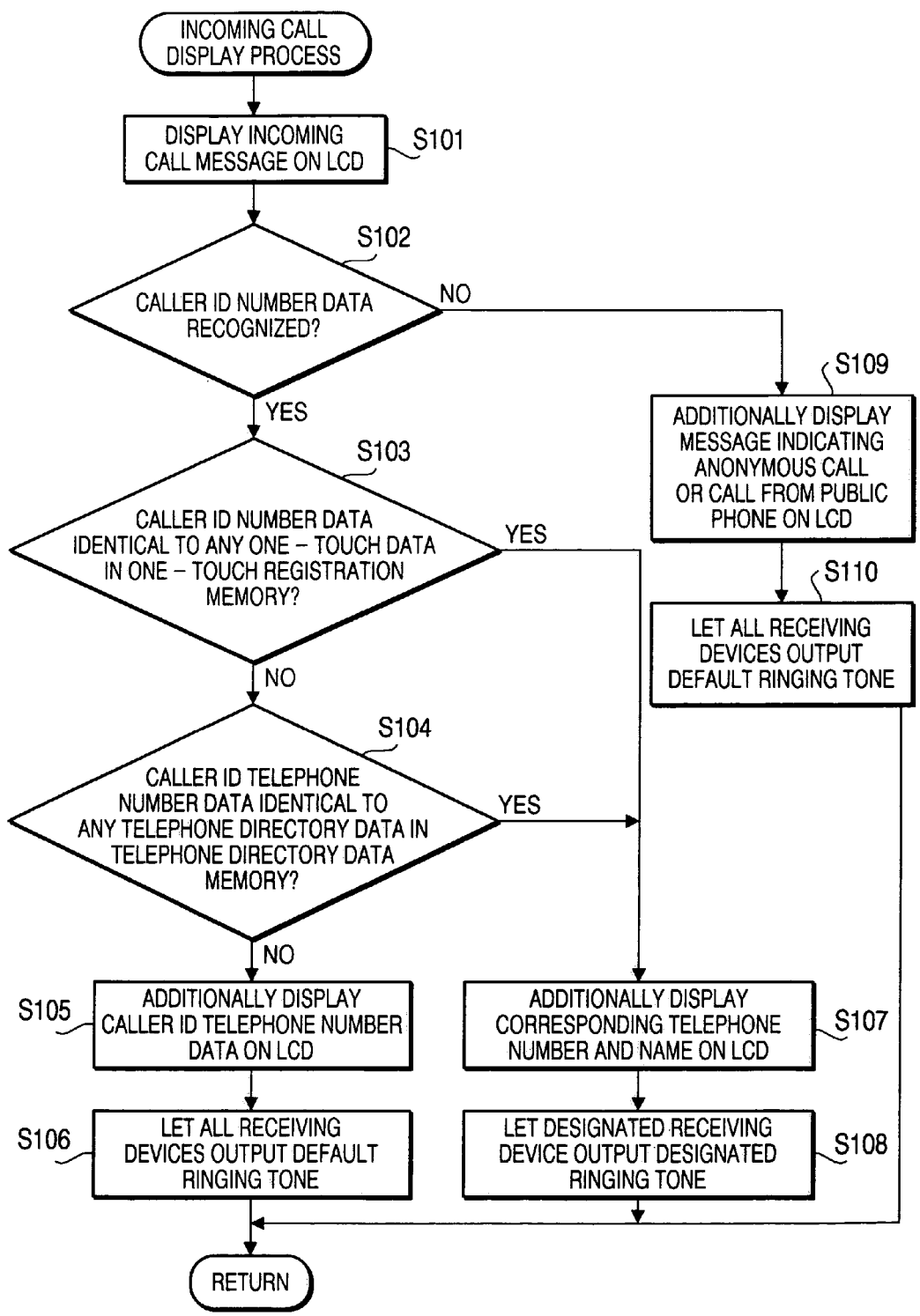

COMMUNICATION DEVICE

BACKGROUND OF THE INVENTION

The present invention relates to a communication device having a one-touch registration memory and a telephone directory data memory.

Conventionally, a communication device having one-touch dials to each of which a telephone number is assigned is known. When the one-touch dial key is operated, a call for the assigned telephone number is made. Specifically, in such a communication device, destination telephone numbers are stored, in a one-touch registration memory, in association with respective one-touch dials, and when one of the one-touch dials is operated by a user, the telephone number corresponding to the operated one-touch dial key is retrieved from the one-touch registration memory and the telephone call is made with respect to the retrieved telephone number. Examples of such a device include a telephone machine and a facsimile machine. Generally, to such one-touch dial keys, the telephone numbers which are more frequently used by the user may be assigned.

An example of a telephone number registering device used in the communication devices as described above is disclosed in Japanese Utility Model Provisional Publication No. HEI4-78849. According to the publication, the telephone number registering device includes a telephone number memory that stores telephone numbers input through ten keys, a data memory that stores destination information including one-touch numbers or speed dial numbers of destinations, and a number registering system that copies the telephone numbers stored in the dial number memory into the data memory. The one-touch number which is not used (i.e., no telephone number is associated with the one-touch number) is searched in the data memory, and the telephone number stored in the dial number memory is copied in the data memory to associate with the unused (unregistered) one-touch dial number or speed dial number so that the telephone number is associated with the one-touch dial number or the speed dial number.

In the conventional telephone number registering device disclosed in the publication, if all the one-touch dial numbers in the data memory are associated with some telephone numbers, and if a new telephone number is to be associated with one of the one-touch dial numbers, one registered telephone number should be deleted.

Further, if a communication device (e.g., telephone or facsimile machine) is configured such that the one-touch numbers are stored separately from the telephone directory data and the telephone numbers associated with the one-touch numbers are not used as the telephone directory data, when the user intends to register one of the telephone numbers stored as the telephone directory data with a one-touch dial number and if all the one-touch dial numbers have been associated with telephone numbers, the user is required to manually register a telephone number assigned to one of the one-touch dial number with the telephone directory data before assigning the new telephone number to the one-touch dial number.

SUMMARY OF THE INVENTION

The present invention is advantageous in that an improved communication device is provided, in which the telephone number data registered with the one-touch registering memory can be automatically copied to telephone directory data memory when necessary.

According to an aspect of the invention, there is provided a communication device that makes a call origination in accordance with a predetermined operation, which is provided with a one-touch dial storage that stores telephone numbers in association with one-touch dial keys, a telephone directory data storage that stores telephone numbers which are not associated with one-touch dial keys, and a copying system that copies at least the telephone number stored in the one-touch dial storage into the telephone directory data storage.

Optionally, when a new telephone number is to be stored, in association with one of the one-touch dial keys, in the one-touch dial storage but all the one-touch dial keys have associated telephone numbers, the copying system may copy one of the telephone numbers associated with the one-touch dial keys to the telephone directory data storage.

Further optionally, the communication device as above may include a first memory including the one-touch dial storage and the telephone directory data storage, a second memory that stores call origination history data including telephone numbers having been originated, and a call origination frequency detecting system that detects a frequency for each telephone number based on the call origination history stored in the second memory. In this case, the copying system may copy the telephone number whose call origination frequency is less than a predetermined value prior to the other telephone numbers.

Additionally, the copying system may copy the telephone number having the lowest call origination frequency prior to the other telephone numbers.

Optionally or alternatively, the communication device may further include a requesting system that requests a user to determine whether a telephone number which is stored in the telephone directory data storage and whose call origination frequency is greater than the predetermined value is to be copied to the one-touch dial storage.

Further optionally, the communication device may further include a designating system that allows a user to designate a one-touch dial key, a telephone number to be newly registered being stored in the one-touch dial storage in association with the designated one-touch dial key, and an association changing system that makes the telephone number associated with the designated one-touch dial key be associated with an idle one-touch dial key with which no telephone number is associated if the designated one-touch key already has an associated telephone number. The copying system maybe configured not to copy the telephone number associated with the designated one-touch dial key when the telephone number is changed to be associated with the idle one-touch dial key.

Optionally, if there is no idle one-touch dial key, the copying system copies the telephone number associated with the designated one-touch dial key in the telephone directory data storage, the new telephone number being registered in association with the designated one-touch dial key.

Further, the communication device may further include a first determination system that allows a user to determine whether the telephone number associated with the designated one-touch key is to be changed, a second determination system that allows the user to determine whether the new telephone number overwrites the telephone number associated with the designated one-touch key. In this case, the copying system may copy the telephone number associated with the designated one-touch key to the telephone directory data storage if the new telephone number overwrites the telephone number associated with the designated one-touch dial key.

Still optionally, when there is no idle one-touch key, the copying system may select one of the telephone numbers associated with the one-touch keys and copies the selected telephone number in the telephone directory data storage.

Furthermore, the communication device may further include a first memory including the one-touch dial storage and the telephone directory data storage, a second memory that stores call origination history data including telephone numbers having been originated, and a call origination frequency detecting system that detects a frequency for each telephone number based on the call origination history stored in the second memory. In this case, the copying system may copy the telephone number whose call origination frequency is less than a predetermined value prior to the other telephone numbers.

Optionally, the copying system may be configured to copy the telephone number having the lowest call origination frequency prior to the other telephone numbers.

Still optionally, the new telephone number can be registered to be associated with the one-touch dial key of which the previously associated telephone number is copied to the telephone directory data storage.

Yet optionally, the telephone number associated with the designated one-touch dial key may be re-registered to be associated with the one-touch dial key of which the previously associated telephone number is copied to the telephone directory data storage, the new telephone number being registered to be associated with the designated one-touch dial key.

Further optionally, the communication device may further include a sorting system that sorts the telephone directory data stored in the telephone directory data storage in accordance with a predetermined sorting condition, and a displaying system that displays the telephone directory data. In this case, the sorting system may sort the telephone directory data after the copying system copies the telephone number to the telephone directory data, and the displaying system may display telephone number as copied and telephone numbers before and after the telephone number as copied in a sorted order.

According to another aspect of the invention, there is provided a communication device that makes a call origination in accordance with a predetermined operation. The communication device is configured to include a one-touch dial storage that stores telephone numbers in association with one-touch dial keys, a designating system that allows a user to designate a one-touch dial key, a telephone number to be newly registered being stored in the one-touch dial storage in association with the designated one-touch dial key, and an association changing system that makes the telephone number associated with the designated one-touch dial key be associated with another one-touch dial key if the designated one-touch key already has an associated telephone number.

According to a further aspect of the invention, there is provided a communication device that makes a call origination in accordance with a predetermined operation, which is provided with a one-touch dial storage that stores telephone numbers in association with one-touch dial keys, a telephone directory data storage that stores telephone numbers which are not associated with one-touch dial keys, a designating system that allows a user to designate a one-touch dial key, a telephone number to be newly registered being stored in the one-touch dial storage in association with the designated one-touch dial key, and a copying system that copies the telephone number associated with the designated one-touch dial key and is stored in the one-touch dial storage into one of the one-touch dial storage in association with another one-touch dial key and the telephone directory data storage.

According to a furthermore aspect of the invention, there is provided a computer program product including computer readable instructions that cause a computer to function as a communication device that makes a call origination in accordance with a predetermined operation. Such a communication device includes a one-touch dial storage that stores telephone numbers in association with one-touch dial keys, a telephone directory data storage that stores telephone numbers which are not associated with one-touch dial keys, and a copying system that copies at least the telephone number stored in the one-touch dial storage into the telephone directory data storage.

According to another aspect of the invention, there is provided a computer program product comprising computer readable instructions that cause a computer to function as a communication device that makes a call origination in accordance with a predetermined operation. The communication device realized by the computer includes a one-touch dial storage that stores telephone numbers in association with one-touch dial keys, a designating system that allows a user to designate a one-touch dial key, a telephone number to be newly registered being stored in the one-touch dial storage in association with the designated one-touch dial key, and an association changing system that makes the telephone number associated with the designated one-touch dial key be associated with another one-touch dial key if the designated one-touch key already has an associated telephone number.

According to a further aspect of the invention, there is provided a computer program product comprising computer readable instructions that cause a computer to function as a communication device that makes a call origination in accordance with a predetermined operation. The communication device realized by the computer includes a one-touch dial storage that stores telephone numbers in association with one-touch dial keys, a telephone directory data storage that stores telephone numbers which are not associated with one-touch dial keys, a designating system that allows a user to designate a one-touch dial key, a telephone number to be newly registered being stored in the one-touch dial storage in association with the designated one-touch dial key, and a copying system that copies the telephone number associated with the designated one-touch dial key and is stored in the one-touch dial storage into one of the one-touch dial storage in association with another one-touch dial key and the telephone directory data storage.

BRIEF DESCRIPTION OF THE DRAWINGS

FIG. 7 is a flowchart showing an incoming call display process executed by the facsimile machine;

DESCRIPTION OF THE EMBODIMENTS

Figure 1:
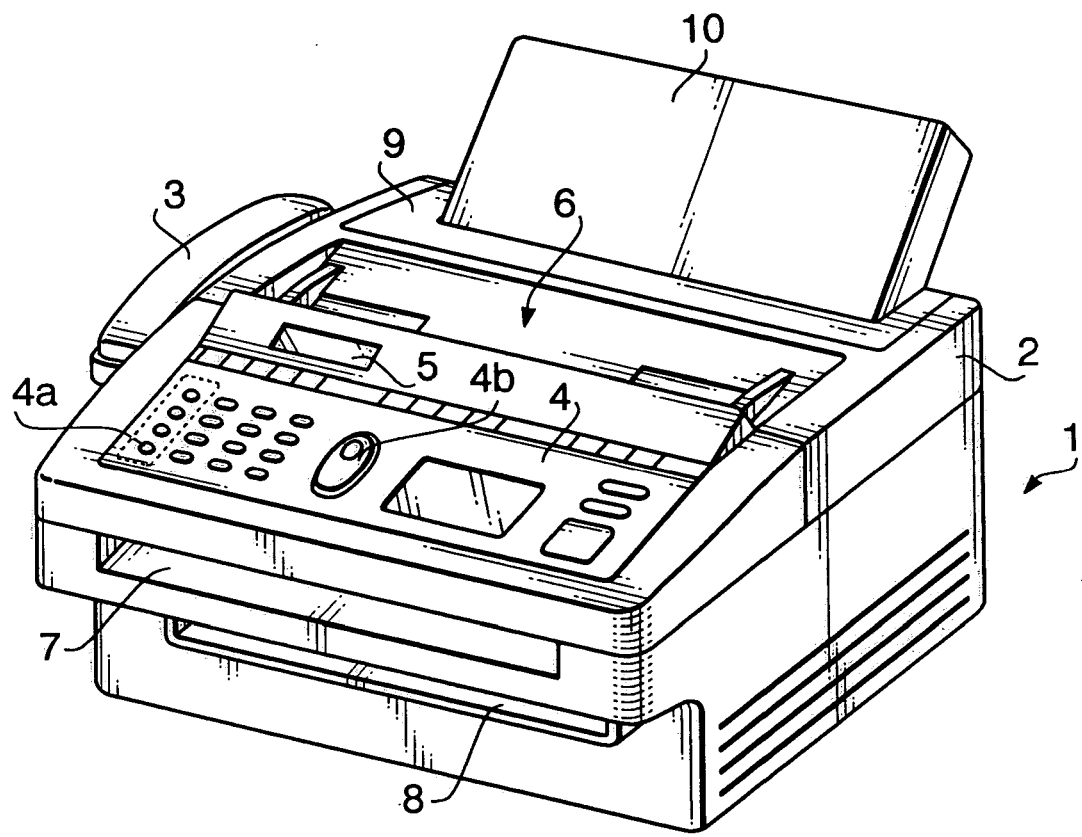
FIG. 1 is a perspective view showing a facsimile machine, which is an example of a communication device in accordance with a first embodiment of the present invention.

Referring now to the drawings, a description will be given in detail of embodiments in accordance with the present invention.

FIG. 1 is a perspective view showing a facsimile machine 1 according to a first embodiment of the present invention. The facsimile machine 1 shown in FIG. 1 has a handset 3 which is attached on a lateral part (on a side portion) of the body 2. The handset 3 is put on an unshown hook of the body 2 when there is no telephone call, while the handset 3 is picked up from the hook and used when a phone call occurs. The former state will be referred to as an "on-hook state" and the latter state will be referred to as an "off-hook state". An operation panel 4, having a plurality of keys including four one-touch dialing keys 4a and a jog key 4b, is provided on the front part of the top surface of the body 2, and an LCD (Liquid Crystal Display) 5 is placed on the left rear side of the operation panel 4. In the facsimile machine 1, when various keys on the operation panel 4 (e.g., the one-touch dialing keys 4a, the jog key 4b) are operated, information related to the operation of the key (e.g., the status of operation, operating procedure) is displayed on the LCD 5.

To the rear of the operation panel 4 and the LCD 5, a document inlet 6 is formed. A document to be faxed is inserted into the document inlet 6 with its document surface facing downward. After the scanning or reading of information on the document surface is finished, the document is ejected from a document outlet 7 which is formed at the front of the body 2 below the operation panel 4. To a sheet holder base 9, which is formed behind the document inlet 6, a sheet holder 10, capable of storing a plurality of sheets stacked up, is attached detachably. The sheets are fed from the sheet holder 10 to the inside of the facsimile machine 1 and information such as image data received by the facsimile machine 1 is printed on the sheets. After the printing, the sheets are ejected from a sheet outlet 8 which is formed below the document outlet 7.

Figure 2:
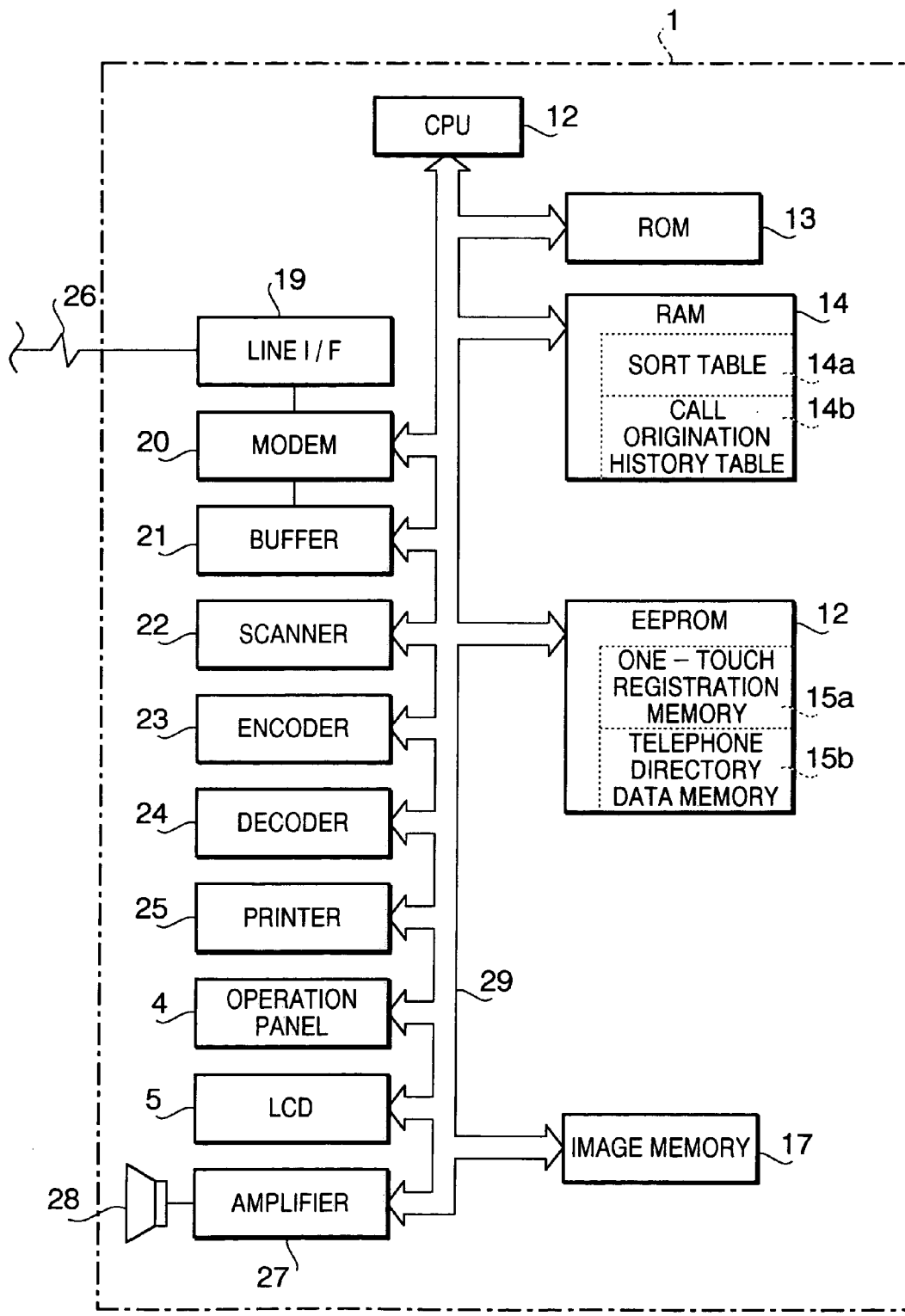
FIG. 2 is a block diagram showing the electrical configuration of the facsimile machine shown in FIG. 1.

FIG. 2 is a block diagram showing the electrical configuration of the facsimile machine 1. The facsimile machine 1 includes a CPU (Central Processing Unit) 12, a ROM (Read Only Memory) 13, a RAM (Random Access Memory) 14, an EEPROM (Electrically Erasable Programmable ROM) 15, an image memory 17, a line I/F 19, a modem 20, a buffer 21, a scanner 22, an encoder 23, a decoder 24, a printer 25, the operation panel 4, the LCD 5 and an amplifier 27, which are interconnected through a bus line 29.

The facsimile machine 1 is connected to a telephone line 26 via the line I/F 19 which carries out line control. The line I/F 19 receives various signals including tone signals (DTMF signal, CNG signal, etc.), a signal indicating the telephone number of the device of the caller (phone number of the caller), a ringing signal transmitted from a telephone switchboard (not shown), etc., while transmitting a dial signal for call origination (according to the key entry to the operation panel 4) to the switchboard.

The CPU 12 controls the components connected thereto via the bus line 29 according to various signals communicated via the line I/F 19, etc. and thereby implements the facsimile operation and executes data communication.

Figure 5A:
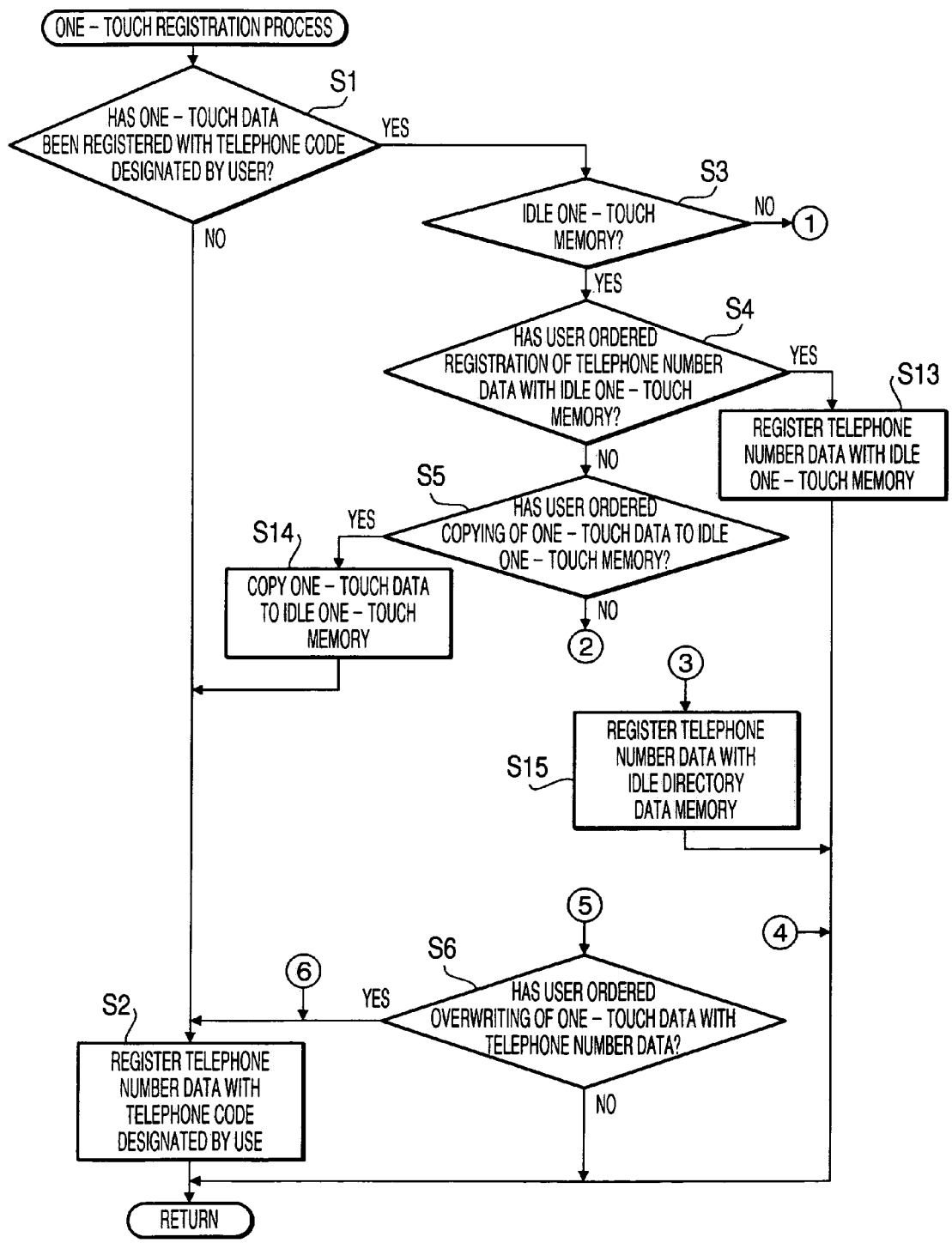
FIGS. 5A and 5B show a flowchart showing a one-touch registration process executed by the facsimile machine of the first embodiment.
Figure 5B:
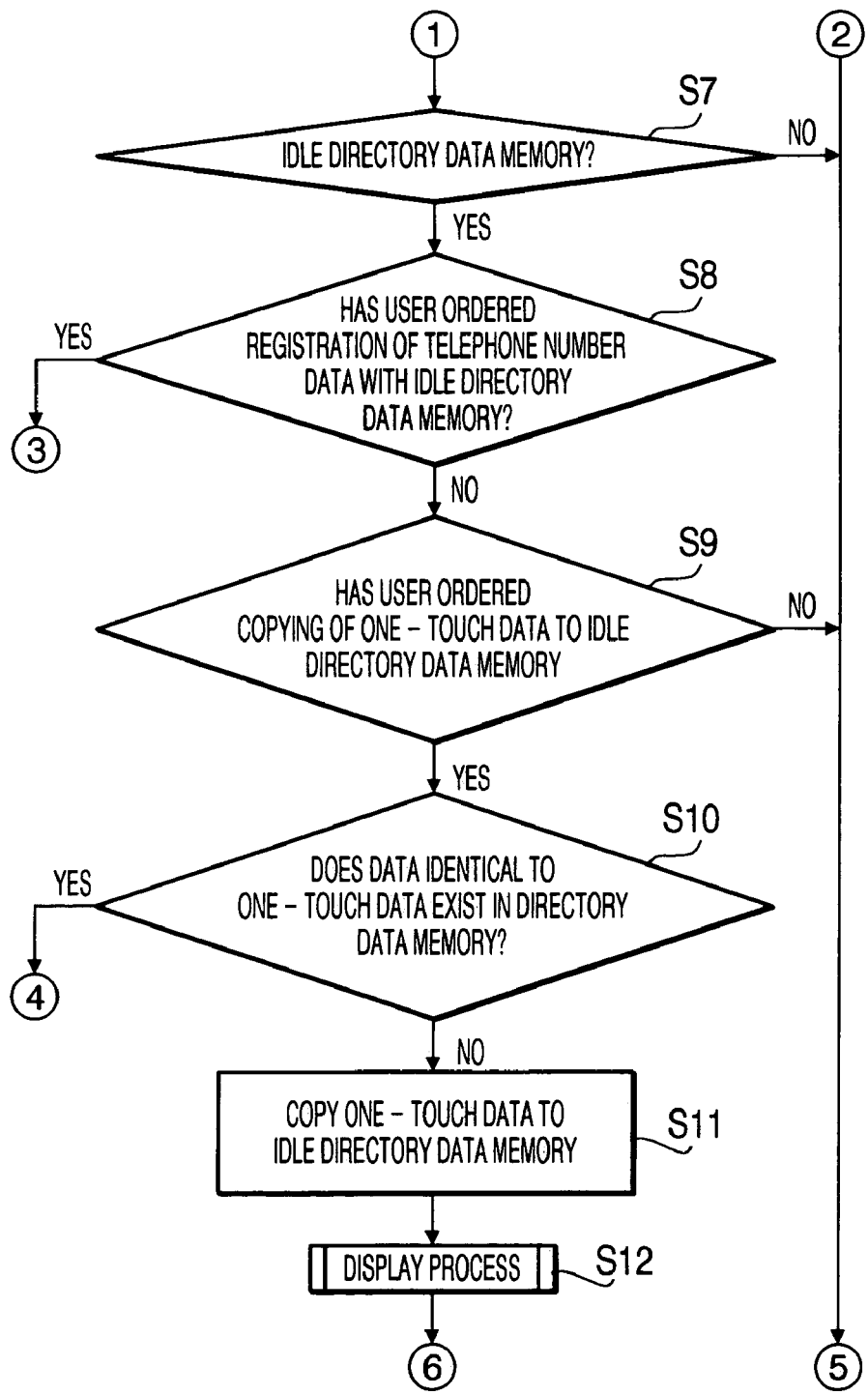

The ROM 13 is a non-rewritable memory for storing control programs and other programs to be executed by the facsimile machine 1. Programs for procedures shown in flowcharts of FIGS. 5A–5B and 7 are also stored in the ROM 13.

The RAM 14 is a memory for temporarily storing various data when each process is carried out by the facsimile machine 1. The RAM 14 includes a sort table 14a to be used for the sorting of telephone codes which correspond to telephone directory data registered with a telephone directory data memory 15b.

Figure 3:
FIG. 3 is a schematic diagram showing an example of a sort table stored in a RAM of the facsimile machine.

FIG. 3 is a schematic diagram showing an example of the sort table 14a. In the sort table 14a, telephone codes 30 (having their corresponding records of telephone directory data registered with the telephone directory data memory 15b) are arranged under a prescribed condition (e.g. in the alphabetic order of names stored in the corresponding records of the telephone directory data). The order of the telephone codes 30 is rearranged (sorted) under the prescribed condition when the power of the facsimile machine 1 is turned on or when the contents of the telephone directory data memory 15b has been changed.

When the jog key 4b or an arrow key (not shown) is manipulated by the user, the telephone codes 30 arranged in the sort table are successively read out one by one depending on the direction of the manipulation, by which the records of the telephone directory data corresponding to the read telephone codes 30 are successively read out from the telephone directory data memory 15b one by one and successively displayed on the LCD 5.

The EEPROM 15 is a rewritable memory capable of storing various data and set values (which are registered or set by the user) in a non-volatile manner. Thus, the data stored in the EEPROM 15 is maintained intact after the power is turned off. The EEPROM 15 includes a one-touch registration memory 15a and the telephone directory data memory 15b.

Figure 4:
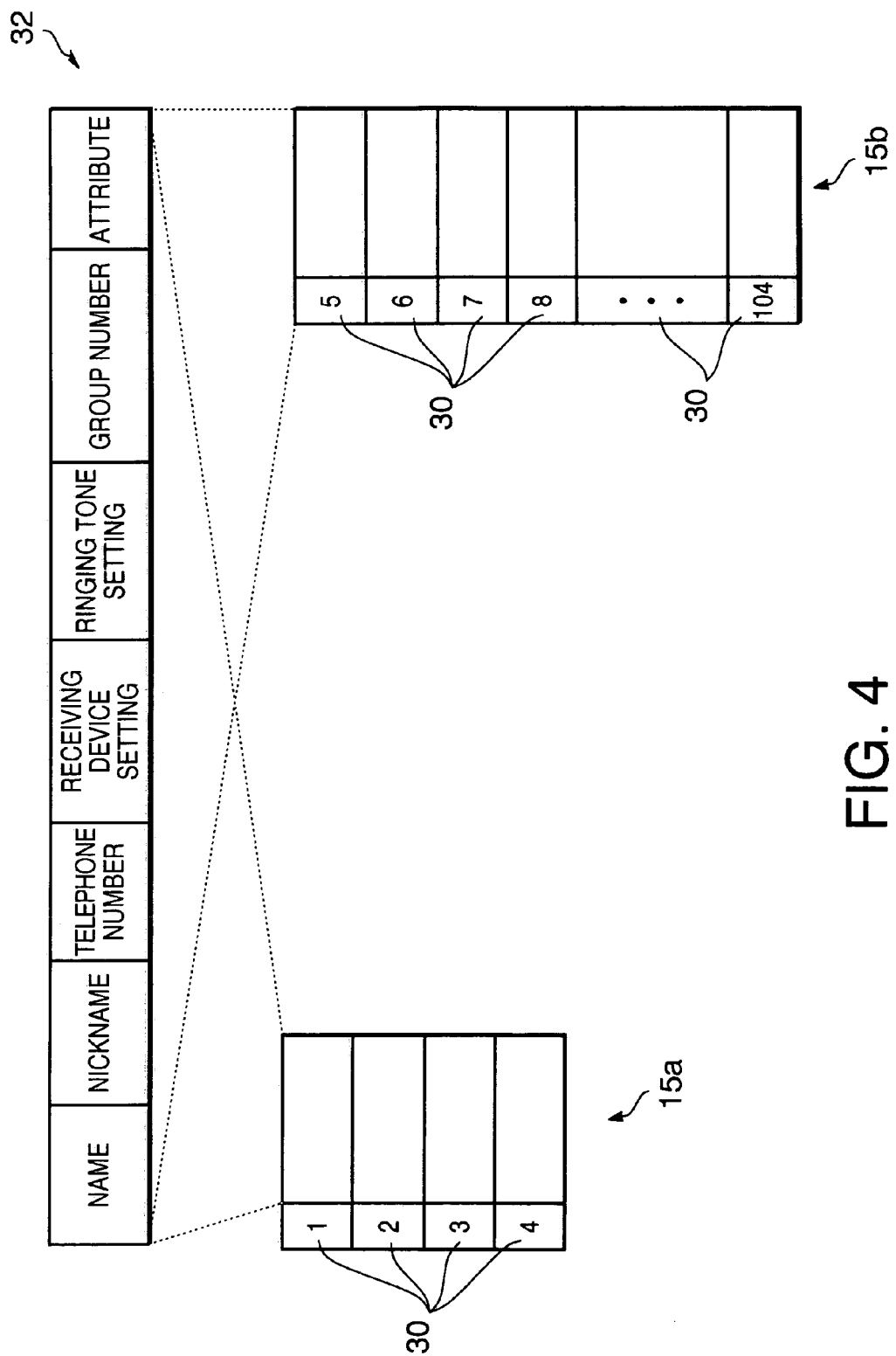
FIG. 4 is a schematic diagram showing the memory configuration of a one-touch registration memory and a telephone directory data memory of the facsimile machine.

The one-touch registration memory 15a is a memory for registering (storing) the telephone number of each selected destination (telephone number or facsimile number of the device of the destination) and additional information (name, etc.) associating them with each of the one-touch dialing keys 4a as one-touch data (see FIG. 4). When a one-touch dialing key 4a is depressed by the user, data of the phone number (telephone number data) of a destination registered with (a storage area of the one-touch registration memory 15a corresponding to) the one-touch dialing key 4a is read out and thereby a call is originated.

The telephone directory data memory 15b is a memory for registering (storing) the telephone number data and the associating information (name, etc.) as the telephone directory data (see FIG. 4). By manipulating the jog key 4b or an arrow key (unshown), the user can search for particular telephone number data (record) registered with the telephone directory data memory 15b in a way like looking into a telephone directory (phone book) and then originate a call by use of the telephone number data by carrying out a prescribed operation.

FIG. 4 is a schematic diagram showing the memory configuration of the one-touch registration memory 15a and the telephone directory data memory 15b. The one-touch registration memory 15*a* is configured to store data (record) 32 (as the aforementioned one-touch data) in each of storage addresses corresponding to four telephone codes 30 ("1"–"4") associated with the four one-touch dialing keys 4*a*. Meanwhile, the telephone directory data memory 15*b* is configured to store data (record) 32 (as the aforementioned telephone directory data) in each of storage addresses corresponding to 100 telephone codes 30 ("5"–"104"). Here, the telephone codes 30 are numbers which are used for managing the one-touch data and the telephone directory data inside the facsimile machine 1.

Both the one-touch data and the telephone directory data are composed of the same data (record) 32 as shown in FIG. 4. Specifically, each record of the data 32 constituting the one-touch data or the telephone directory data includes the "telephone number (telephone number of a destination)" data and additional information corresponding to the telephone number. Possible additional information may include "name" data indicating the name of a party corresponding to the phone number, "nickname" data indicating the nickname, abbreviated name, etc. of the party, "readings" data indicating the (Japanese) kana-readings of the name, "receiving device setting" data for previously designating a device (base phone, cordless handset, facsimile, etc.) to which the line should be connected preferentially when the telephone number of the caller is recognized by the "caller ID" function, "ringing tone setting" data for previously designating a ringing tone to be played back when the telephone number of the caller is recognized by the caller ID function, "group number" data indicating a group of telephone number data for successively originating calls to a plurality of telephone numbers for the transmission of a broadcast facsimile, "attribute" data indicating the attribute (telephone set, fax & phone, etc.) of the telephone number data, etc.

The image memory 17 is a memory for storing the history of communication, image data, and bitmap images for the printing. The image memory 17 is composed of a DRAM (Dynamic RAM) which is a low-price high-capacity memory. Received image data is first stored in the image memory 17, printed on the sheets by the printer 25, and then erased from the image memory 17. Image data captured by the scanner 22 is also stored in the image memory 17.

The modem 20 is a device for communicating image information and communication data by means of modulation and demodulation while exchanging various procedure signals for the transmission control. The buffer 21 is a memory for temporarily storing data such as coded image information communicated with the device of the party (caller or destination).

The scanner 22, having a document feed motor, is a device for reading a document inserted into the document inlet 6 and outputting image data. The encoder 23 encodes the image data obtained by the scanner 22. The decoder 24 reads out image data stored in the buffer 21 or the image memory 17 and decodes the image data. The decoded data are printed on the sheets by the printer 25.

The printer 25 (implemented by an ink jet printer, for example) includes a sheet feed motor for feeding the sheets, a carriage motor for driving a carriage which carries a printing head, and the printing head for ejecting ink onto the sheet. The amplifier 27 drives a speaker 28 connected thereto and thereby outputs sound such as the ringing tone.

In the following, a process executed by the facsimile machine 1 composed as above for newly registering telephone number data of a party with the one-touch registration memory 15*a* will be explained referring to FIGS. 5A–5B and 6.

FIGS. 5A and 5B show a flowchart showing a one-touch registration process executed by the facsimile machine 1 of the first embodiment. The one-touch registration process is started when telephone number data to be newly registered with a one-touch dialing key 4*a* is manually inputted by the user or selected by the user from a call origination history or a call reception history and (a telephone code 30 corresponding to) the one-touch dialing key 4*a* (desired by the user for the registration of the telephone number data) is designated.

First, process determines whether one-touch data has already been registered with the telephone code 30 designated by the user (S1). If no one-touch data has been registered with the (telephone code 30 corresponding to) the one-touch dialing key 4*a* designated by the user yet (S1: NO), the inputted telephone number data and additional information newly inputted by the user as needed (name, nickname, etc.) are registered with (a storage address corresponding to) the telephone code 30 designated by the user as one-touch data (S2), and the one-touch registration process is ended.

Meanwhile, if one-touch data has already been registered with the telephone code 30 designated by the user (S1: YES), process determines whether there exists an idle memory space in the one-touch registration memory 15*a* (idle one-touch registration memory) (S3). In this embodiment, the idle one-touch registration memory detected in the step S3 means one of idle storage addresses of the one-touch registration memory 15*a* (storing no data 32) that corresponds to the smallest telephone code 30.

If there exists idle one-touch registration memory (S3: YES), a guidance message for inquiring of the user whether to register the telephone number data (to be registered) with the idle one-touch registration memory or not is displayed on the LCD 5 and thereafter whether the user seeing the guidance message has ordered the registration of the telephone number data with the idle one-touch registration memory or not is checked (S4).

If the user has ordered the registration of the telephone number data with the idle one-touch registration memory (S4: YES), the telephone number data which has been inputted for the new registration and additional information newly inputted by the user as needed (name, nickname, etc.) are registered with the idle one-touch registration memory as the one-touch data (S13) and the one-touch registration process is ended.

Meanwhile, if the user has not ordered the registration of the telephone number data with the idle one-touch registration memory (S4: NO), a guidance message for inquiring of the user whether to copy the one-touch data already registered with the telephone code 30 designated by the user to the idle one-touch registration memory in the one-touch registration memory 15*a* or not is displayed on the LCD 5 and thereafter process determines whether the user seeing the guidance message has ordered the copying of the one-touch data (registered with the telephone code 30 designated by the user) to the idle one-touch registration memory (S5).

When the user has ordered the copying of the one-touch data (registered with the telephone code 30 designated by the user) to the idle one-touch registration memory (S5: YES), the one-touch data which has been registered with the telephone code 30 designated by the user is copied to the idle one-touch registration memory (S14). After the step S14 is finished, the process advances to the step S2 and thereafter the one-touch registration process is ended.

By the step S14, if one-touch data (including telephone number data) has already been registered with the telephone code 30 designated by the user at the point of the new registration (storage) of telephone number data with the telephone code 30 (designated by the user), the one-touch data (already registered with the telephone code 30 designated by the user) can be copied to idle one-touch registration memory if there exists the idle one-touch registration memory. Therefore, after the step S14, even if the telephone number data (to be newly registered) is registered with the telephone code 30 designated by the user by overwriting in the step S2, original telephone number data is prevented from being erroneously lost totally since the one-touch data (including the original telephone number data) which was registered with the telephone code 30 designated by the user has already been switched to another one-touch dialing key 4*a*.

The telephone number is preferentially associated with an idle one-touch dialing key 4*a* when there exists an idle one-touch dial, that is, switching or rearrangement of one-touch data is executed automatically maintaining their attributes as one-touch data. Therefore, the user utilizing the one-touch dialing function (in which telephone numbers of relatively high call origination frequency by the user tend to be registered with the one-touch dialing keys 4*a*) suffers almost no inconvenience.

Meanwhile, when the user has not ordered the copying of the one-touch data (registered with the telephone code 30 designated by the user) to the idle one-touch registration memory (S5: NO), a guidance message for inquiring of the user whether to overwrite the one-touch data (registered with the telephone code 30 designated by the user) with the telephone number data to be newly registered or not is displayed on the LCD 5 and thereafter process determines whether the user seeing the guidance message has ordered the overwriting of the one-touch data (registered with the telephone code 30 designated by the user) with the telephone number data (to be newly registered) (S6).

When the user has ordered the overwriting of the one-touch data (registered with the telephone code 30 designated by the user) with the telephone number data (to be newly registered) (S6: YES), the process advances to the step S2.

Meanwhile, when the user has not ordered the overwriting of the one-touch data (registered with the telephone code 30 designated by the user) with the telephone number data (to be newly registered) (S6: NO), the one-touch registration process is ended executing no process.

In the judgment of the step S3, when there exists no idle one-touch registration memory (S3: NO), process determines whether there exists an idle memory space in the telephone directory data memory 15*b* with which no telephone number data has been registered (idle telephone directory data memory) (S7). In this embodiment, the idle telephone directory data memory detected in the step S7 means one of idle storage addresses of the telephone directory data memory 15*b* (storing no data 32) that corresponds to the smallest telephone code 30.

When there exists idle telephone directory data memory (S7: YES), a guidance message for inquiring of the user whether to register the telephone number data (to be registered) with the idle telephone directory data memory or not is displayed on the LCD 5 and thereafter process determines whether the user seeing the guidance message has ordered the registration of the telephone number data with the idle telephone directory data memory (S8).

When the user has ordered the registration of the telephone number data (to be registered) with the idle telephone directory data memory (S8: YES), the telephone number data to be registered and additional information newly inputted by the user as needed (name, nickname, etc.) are registered with the idle telephone directory data memory as the telephone directory data (S15), and the one-touch registration process is ended.

Meanwhile, when the user has not ordered the registration of the telephone number data (to be registered) with the idle telephone directory data memory (S8: NO), a guidance message for inquiring of the user whether to copy (duplicate) the one-touch data already registered with the telephone code 30 designated by the user to the idle telephone directory data memory or not is displayed on the LCD 5 and thereafter process determines whether the user seeing the guidance message has ordered the copying of the one-touch data (registered with the telephone code 30 designated by the user) to the idle telephone directory data memory (S9).

When the user has ordered the copying of the one-touch data (registered with the telephone code 30 designated by the user) to the idle telephone directory data memory (S9: YES), whether data identical with the one-touch data ordered to be copied (i.e. the one-touch data registered with the telephone code 30 designated by the user) already exists in the telephone directory data memory 15*b* or not is checked (S10).

When no data identical with the one-touch data ordered to be copied exists in the telephone directory data memory 15*b* (S10: NO), the one-touch data is copied to the idle telephone directory data memory as the telephone directory data (S11).

Since the one-touch data (including telephone number data) which has already been registered with the telephone code 30 designated by the user is copied to the idle telephone directory data memory as the telephone directory data by the step S11, the telephone number data which has been registered as one-touch data can be registered as telephone directory data. Therefore, when the telephone number data can be registered with the one-touch registration memory 15*a* and the telephone directory data memory 15*b* independently as in this embodiment, even if the telephone number data (to be newly registered) is registered with the telephone code 30 designated by the user by overwriting in the step S2 after the step S11 as will be mentioned below, original telephone number data is prevented from being erroneously lost totally since the one-touch data (including the original telephone number data) which was registered with the telephone code 30 designated by the user has already been preserved in the telephone directory data memory 15*b*.

After the step S11, a display process is executed (S12), in which the position of the telephone directory data placed in the telephone directory (when the one-touch data registered with the one-touch registration memory 15*a* has been copied to the telephone directory data memory 15*b* as the telephone directory data) is displayed on the LCD 5.

Figures 6A, 6B, 6C:
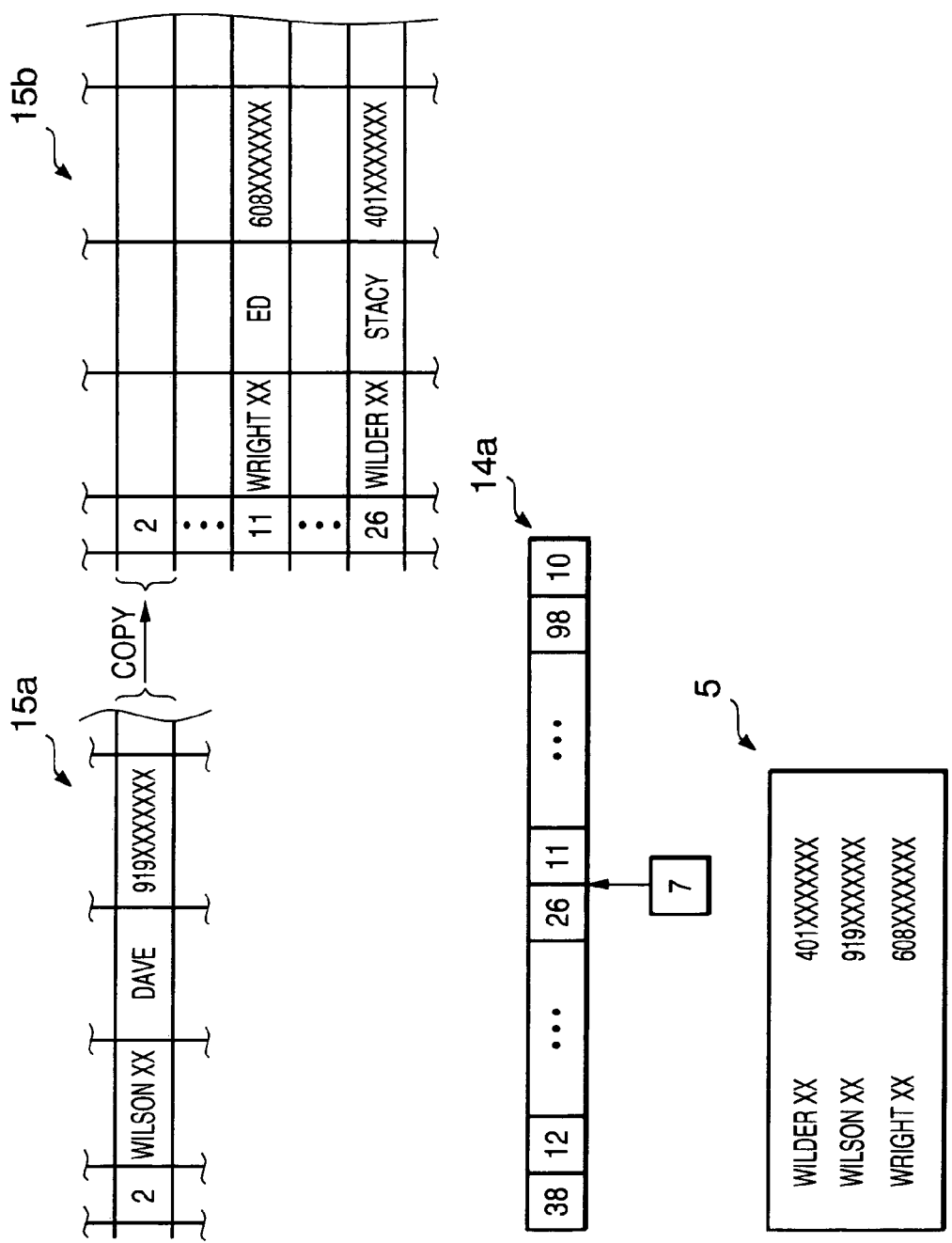
FIGS. 6A–6C are schematic diagrams depicting the procedure of a display process.

Here, the display process (S12) will be explained in detail referring to FIGS. 6A–6C. FIGS. 6A–6C are schematic diagrams depicting the procedure of the display process (S12). For example, when one-touch data (name data: "WILSON XX") which has been registered with a telephone code "2" in the one-touch registration memory 15*a* is copied to a telephone code "7" in the telephone directory data memory 15*b* in the step S11 as shown in FIG. 6A, the data sorting is carried out by the sort table 14*a*. By the sorting, the telephone code "7" is placed between a telephone code "26" (name data: "WILDER XX") and a telephone code "11" (name data: "WRIGHT XX") as shown in FIG. 6B. The result of the sorting is displayed on the LCD 5 as shown in FIG. 6C, by which the user can visually confirm that the telephone number data of "WILSON XX" copied from the one-touch registration memory 15a to the telephone directory data memory 15b has been placed between the telephone number data of "WILDER XX" and the telephone number data of "WRIGHT XX" in the telephone directory data. Since the telephone directory data are generally displayed on the LCD 5 by the manipulation of the jog key 4b or the arrow keys (unshown) in the order of arrangement of the telephone directory data, the previous confirmation of the relative position of the telephone number data copied into the telephone directory data is highly convenient for the user.

Returning to FIGS. 5A and 5B, when there exists no idle telephone directory data memory in the judgment of the step S7 (S7: NO) or when the user has not ordered the copying of the one-touch data (registered with the telephone code 30 designated by the user) to the idle telephone directory data memory in the judgment of the step S9 (S9: NO), the process advances to the step S6.

In the judgment of the step S10, when data identical with the one-touch data ordered to be copied already exists in the telephone directory data memory 15b (S10: YES), the one-touch registration process is ended executing no process.

As described above, by the facsimile machine 1 in accordance with the first embodiment of the present invention, in the new registration of telephone number data with a one-touch dialing key 4a, even if one-touch data has already been registered with the one-touch dialing key 4a designated by the user for the registration of the telephone number data, the one-touch data (stored in a storage area of the one-touch registration memory 15a corresponding to the one-touch dialing key 4a designated by the user) can be copied to the telephone directory data memory 15b. Therefore, in facsimile machines in which the one-touch data are stored in the one-touch registration memory 15a separately and independently of the telephone directory data stored in the telephone directory data memory 15b and are not used as the telephone directory data as in this embodiment, loss of original one-touch data (already stored in a storage area of the one-touch registration memory 15a), caused by the overwriting of the storage area with the new telephone number data, can be prevented without requiring the user to save the original one-touch data by manually copying it to the telephone directory data memory 15b.

Incidentally, when the facsimile machine 1 employs the caller ID function, an incoming call display process is executed when the reception of data representing the telephone number of the caller (caller ID telephone number data) is recognized. FIG. 7 is a flowchart showing the incoming call display process, in which if the recognized caller ID (the number of the incoming call) matches telephone number data that has been registered with the one-touch registration memory 15a or the telephone directory data memory 15b, the name of the caller is displayed on the LCD 5 and a ringing tone designated by the "ringing tone setting" data is played back by the receiving device designated by the "receiving device setting" data, according to the contents of the registered data.

The incoming call display process is started when an incoming call is detected by the facsimile machine 1 supporting the caller ID function. First, a message indicating the arrival of the incoming call is displayed on the LCD 5 (S101) and whether caller ID data has been recognized or not is checked (S102). When the caller ID data has been recognized (S102: YES), process determines whether the recognized caller ID telephone number data is identical to any of the one-touch data registered with the one-touch registration memory 15a (S103).

In the step S103, the caller ID data (a number with four or more digits) is compared with each telephone number data (a number with four or more digits) of the one-touch data (hereinafter referred to as "one-touch dial telephone number data") starting from their ends, and the telephone numbers of the data are judged to be identical to each other when all the digits of shorter telephone number data (having smaller number of digits) are identical with corresponding digits of the other telephone number data. For example, when the caller ID data "5151234567" and one-touch dial telephone number data "4567" are judged to be identical to each other, and the caller ID data "4567" and one-touch dial telephone number data "5151234567" are also judged to be identical.

Meanwhile, the caller ID data "5151234567" and one-touch dial telephone number data "6151234567" are judged to be not identical. Incidentally, the caller ID data "5151234567" and one-touch dial telephone number data "567" are judged to be not identical since the number of digits of the one-touch dial telephone number data is less than four. Similarly, the caller ID data "567" and one-touch dial telephone number data "5151234567" are judged to be not identical.

In the step S103, since the caller ID data and the one-touch dial telephone number data both having four or more digits are compared with each other starting from their ends, whether the numbers are identical or not can be judged effectively even when telephone number data containing a long distance number is compared with telephone number data containing no long distance number, for example.

If the recognized caller ID data is identical to none of the one-touch data registered with the one-touch registration memory 15a (S103: NO), process determines whether the caller ID telephone number data is identical to any of the telephone directory data registered with the telephone directory data memory 15b (S104). In the step S104, similarly to the aforementioned step S103, the caller ID data of four or more digits is compared with each telephone number data (of four or more digits) of the telephone directory data (hereinafter referred to as "directory telephone number data") starting from their ends, and the telephone numbers of the data are judged to be identical with each other when all the digits of shorter telephone number data (having smaller number of digits) are identical with corresponding digits of the other telephone number data.

Also in the step S104, since the caller ID data and the directory telephone number data both having four or more digits are compared with each other starting from their ends, whether the numbers are identical or not can be judged effectively regardless of whether each telephone number data contains a long distance number or not.

If the recognized caller ID data is identical with none of the directory telephone number data (S104: NO), the recognized caller ID data is additionally displayed on the LCD 5 (which is displaying the message indicating the arrival of the incoming call) so as to let the user recognize the telephone number of the caller (S105), a default ringing tone (by initial setting) is played back by all the receiving devices (S106), and the incoming call display process is ended.

In the judgment of the step S103, if the recognized caller ID data is identical with any of the one-touch dial telephone number data registered with the one-touch registration memory 15a (S103: YES), the one-touch dial telephone number data (registered telephone number) and the name corresponding to the telephone number data are additionally displayed on the LCD 5 (displaying the incoming call message) so as to let the user clearly recognize who the caller is (S107), a ringing tone designated for the one-touch dial telephone number data is played back by the designated receiving device (S108), and the incoming call display process is ended.

In the judgment of the step S104, if the recognized caller ID data is identical with any of the directory telephone number data registered with the telephone directory data memory 15*b* (S104: YES), the directory telephone number data (registered telephone number) and the name corresponding to the telephone number data are additionally displayed on the LCD 5 (displaying the incoming call message) so as to let the user clearly recognize who the caller is (S107), a ringing tone designated for the directory telephone number data is played back by the designated receiving device (S108), and the incoming call display process is ended.

In the judgment of the step S102, when no caller ID data has been recognized (S102: NO), it means that the caller is making an anonymous call or making a call from a public phone, therefore, a message indicating that the call is an anonymous call or from a public phone is additionally displayed on the LCD 5 (displaying the incoming call message) (S109), a default ringing tone is played back by all the receiving devices (S110), and the incoming call display process is ended.

In the following, a facsimile machine 1 in accordance with a second embodiment of the present invention will be described in detail. In the facsimile machine 1 of the above first embodiment, when telephone number data is newly registered with a telephone code 30 of the one-touch registration memory 15*a* designated by the user as one-touch data, if other one-touch data has already been registered with the telephone code 30 designated by the user and there exists no idle memory in the one-touch registration memory 15*a* (idle one-touch registration memory), the one-touch data already registered with the telephone code 30 designated by the user can be copied (duplicated) to the idle telephone directory data memory.

Meanwhile, in the facsimile machine 1 of the second embodiment, when telephone number data is newly registered with a telephone code 30 of the one-touch registration memory 15*a* designated by the user as one-touch data, if other one-touch data has already been registered with the telephone code 30 designated by the user and there exists no idle one-touch registration memory, telephone number data registered with the one-touch registration memory 15*a* and having low call origination frequency can be preferentially copied (duplicated) from the one-touch registration memory 15*a* to the telephone directory data memory 15*b* as telephone directory data.

Figure 8A:
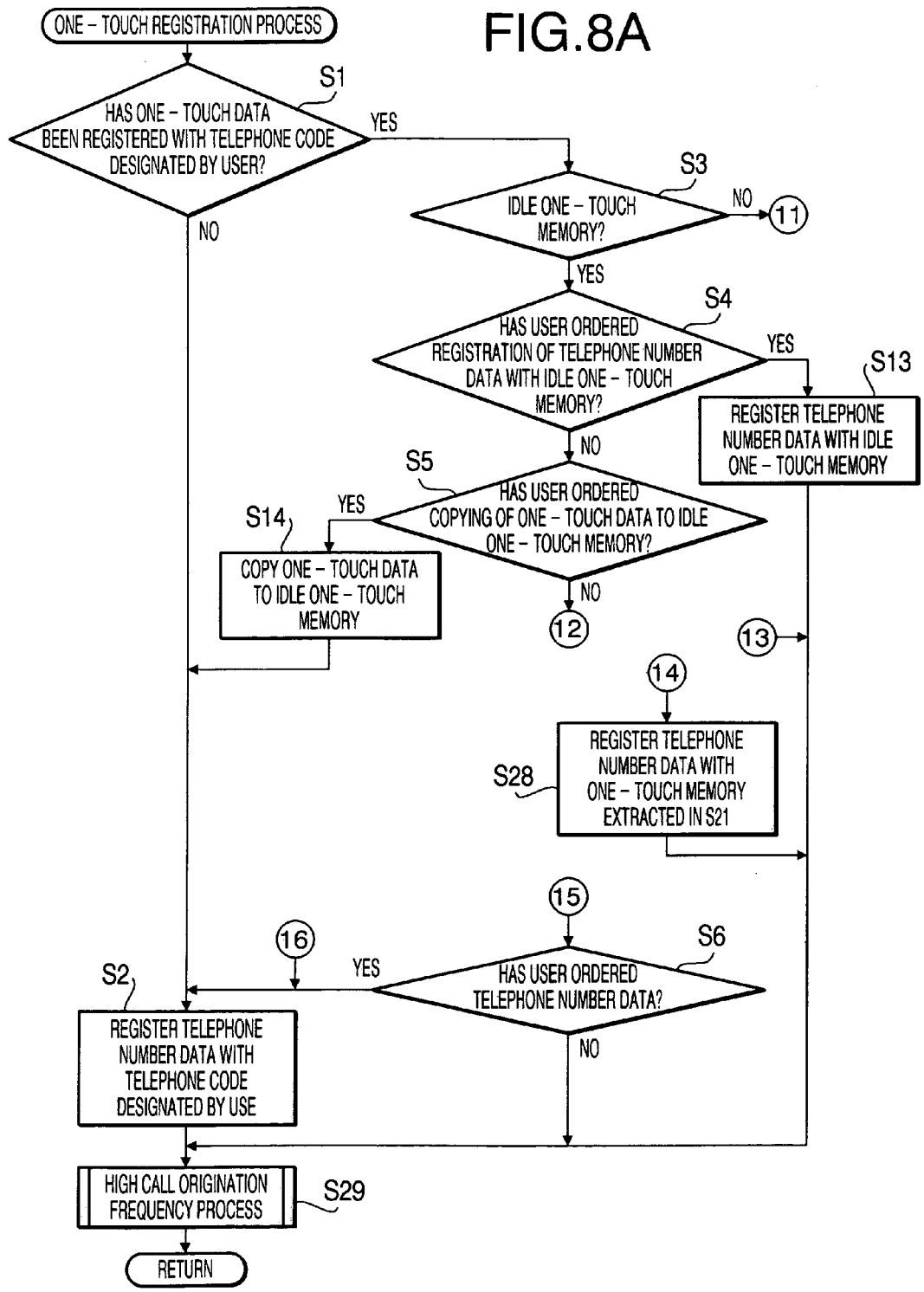
FIGS. 8A and 8B shown a flowchart showing a one-touch registration process executed by a facsimile machine in accordance with a second embodiment of the present invention.
Figure 8B:
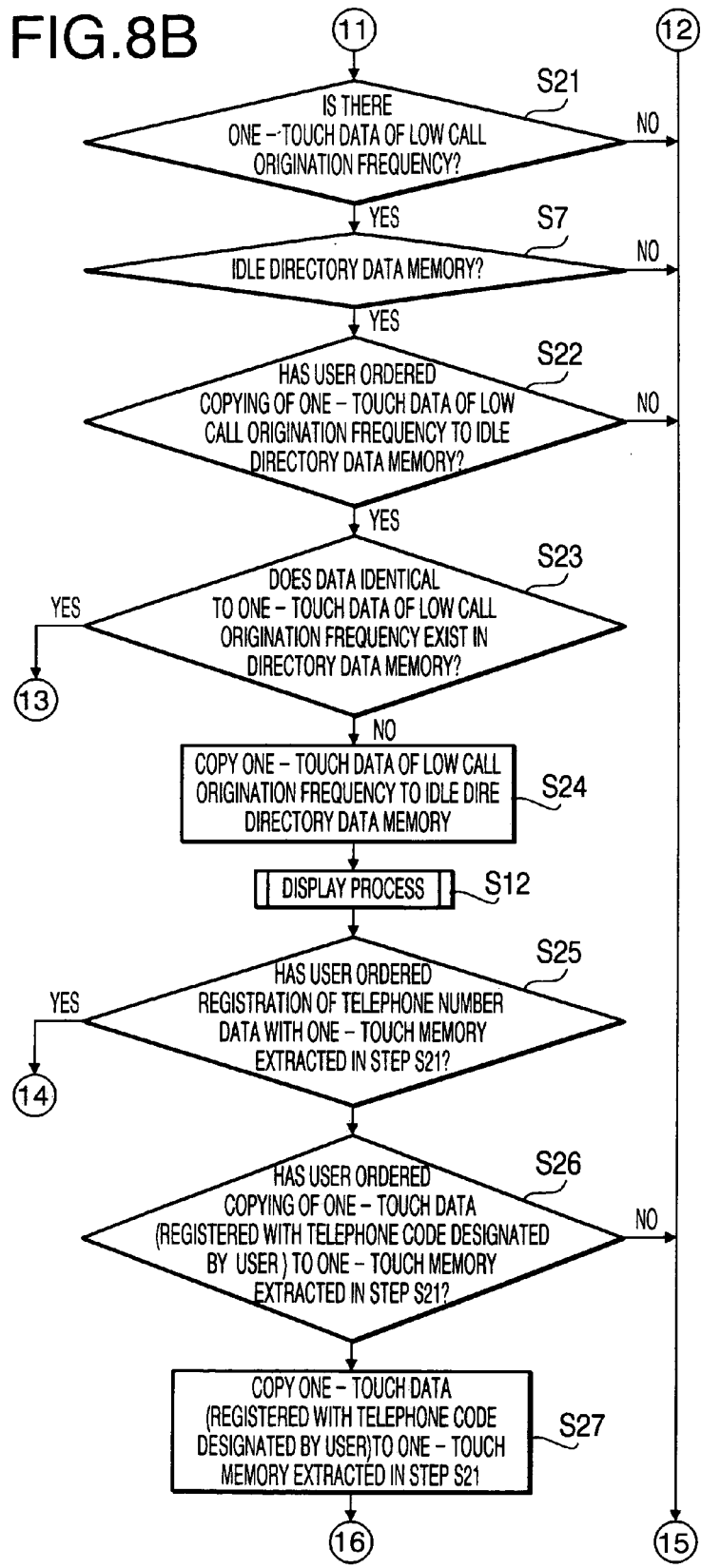
Figure 9:
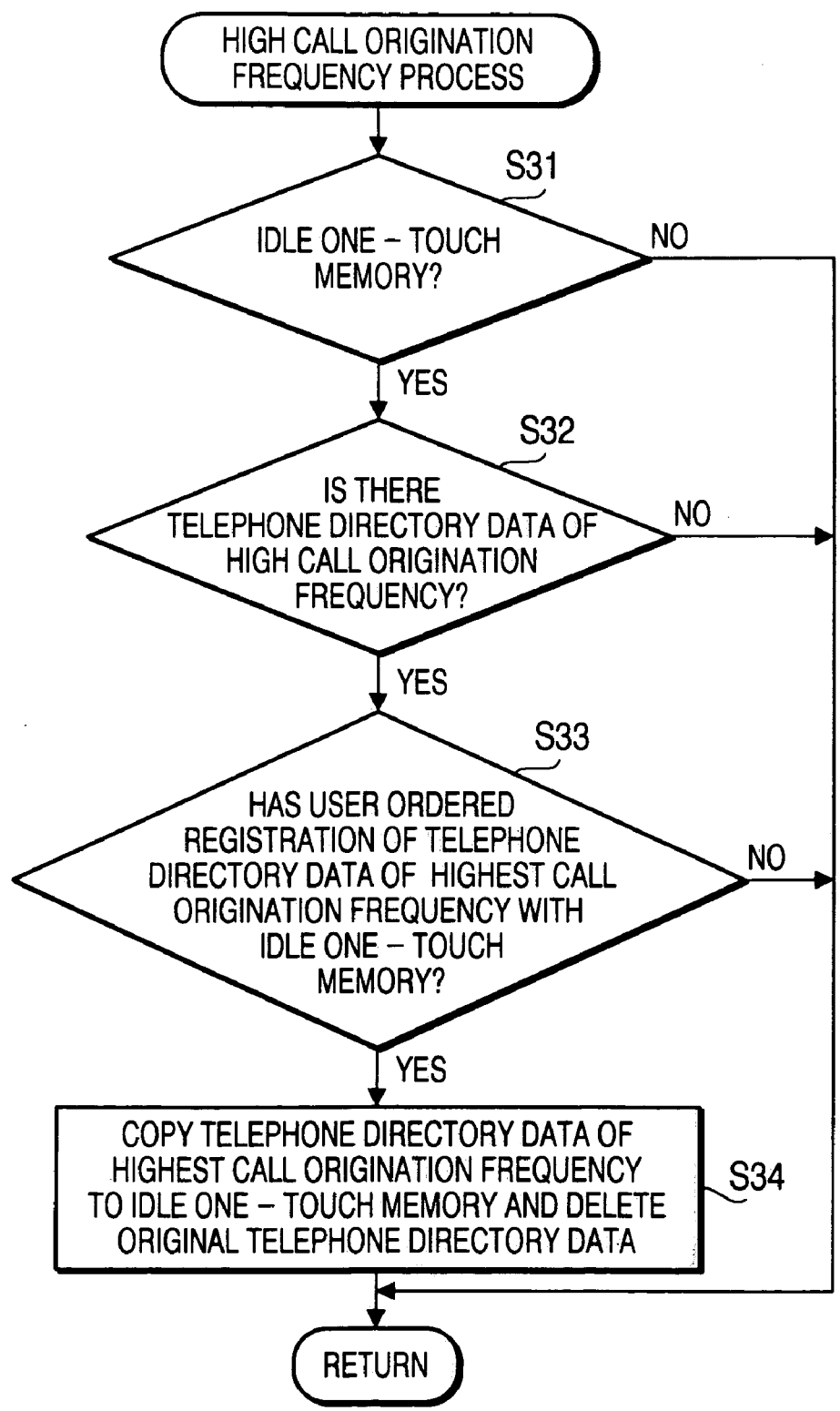
FIG. 9 is a flowchart showing a high call origination frequency process executed by the facsimile machine of the second embodiment.

The process flow of the one-touch registration process employed in the second embodiment will be explained in detail referring to FIGS. 8A–8B and 9. FIGS. 8A and 8B show a flowchart showing the one-touch registration process executed by the facsimile machine 1 of the second embodiment. FIG. 9 is a flowchart showing a high call origination frequency process executed by the facsimile machine 1 of the second embodiment. Programs for implementing the processes shown in FIGS. 8A–8B and 9 are stored in the ROM 13.

In the second embodiment, the RAM 14 further includes a call origination history table 14*b* as a ring buffer for storing the history of telephone numbers called by the facsimile machine 1, differently from the RAM 14 of the first embodiment (see FIG. 2).

Figure 10:
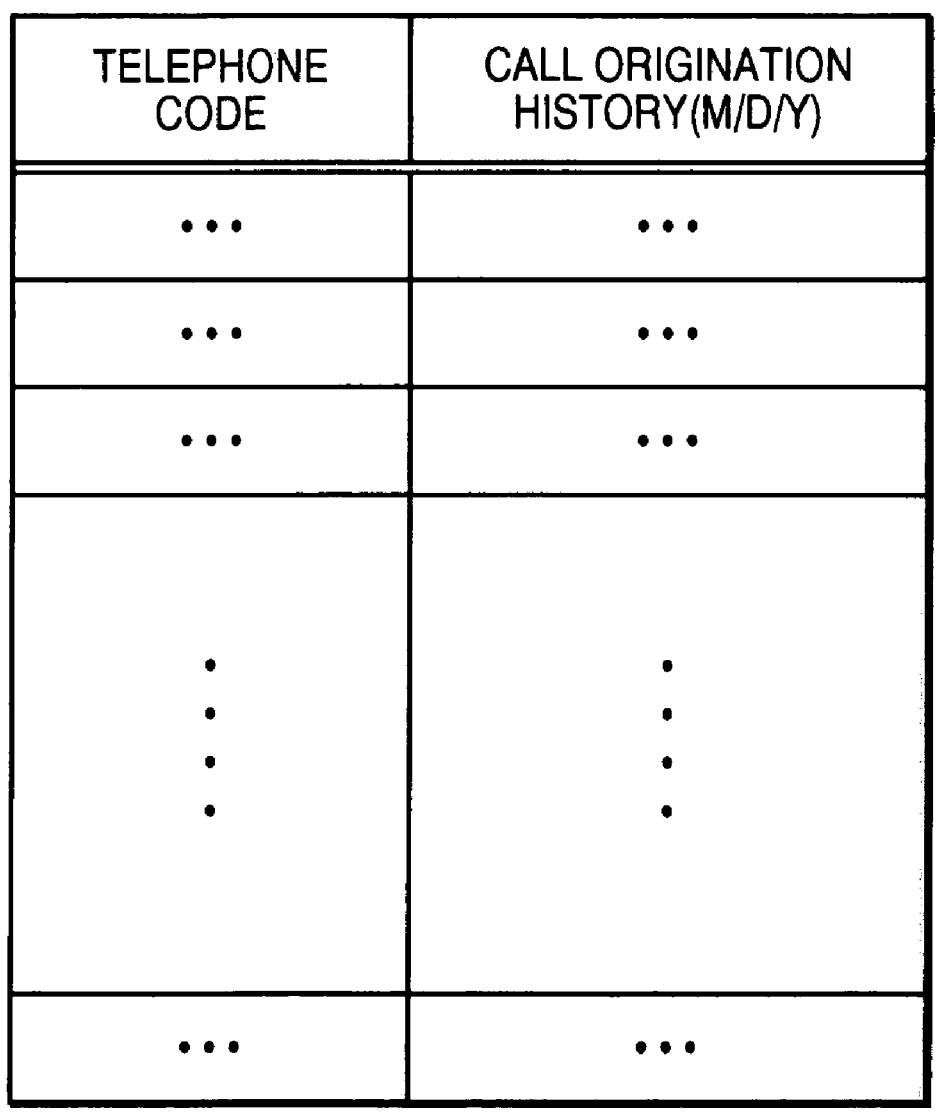
FIG. 10 is a schematic diagram showing a call origination history table of the facsimile machine of the second embodiment.

FIG. 10 is a schematic diagram showing the call origination history table 14*b*. As shown in FIG. 10, the call origination history table 14*b* successively stores a telephone code 30 corresponding to telephone number data used for call origination and call origination history data (timestamp indicating the month/day/year of the call origination) when a call is originated by use of one-touch dial telephone number data or directory telephone number data, starting from the first address of the ring buffer. When the address for storing the call origination history reaches the final address of the call origination history table 14*b*, the storage address is returned to the first address and the storage of the call origination history is continued.

The call origination history table 14*b* is referred to in steps S21 and S29 which will be explained later for determining the call origination frequency regarding one-touch dial telephone number data or directory telephone number data. Since a large storage capacity sufficient for the determination of the call origination frequency is required, it is desirable that the call origination history table 14*b* be formed in the RAM 14 which is low price and high access speed rather than in the expensive EEPROM 15 (including the one-touch registration memory 15*a* and the telephone directory data memory 15*b*).

In the one-touch registration process shown in the flowchart of FIGS. 8A and 8B, the same step numbers as those in the flowchart of FIGS. 5A and 5B are used for the same steps. The one-touch registration process shown in FIGS. 8A and 8B is started when telephone number data to be newly registered with a one-touch dialing key 4*a* is manually inputted by the user or selected by the user from the call origination history or the call reception history and (a telephone code 30 corresponding to) the one-touch dialing key 4*a* (desired by the user for the registration of the telephone number data) is designated.

First, process determines whether one-touch data has already been registered with the telephone code 30 designated by the user (S1). When no one-touch data has been registered with the (telephone code 30 corresponding to) the one-touch dialing key 4*a* designated by the user yet (S1: NO), the inputted telephone number data and additional information newly inputted by the user as needed (name, nickname, etc.) are registered with the telephone code 30 designated by the user as one-touch data (S2) and the one-touch registration process is ended.

Meanwhile, when one-touch data has already been registered with the telephone code 30 designated by the user (S1: YES), process determines whether there exists an idle memory space in the one-touch registration memory 15*a* (idle one-touch registration memory) (S3). When there exists idle one-touch registration memory (S3: YES), a guidance message for inquiring of the user whether to register the telephone number data (to be registered) with the idle one-touch registration memory or not is displayed on the LCD 5 and thereafter process determines whether the user seeing the guidance message has ordered the registration of the telephone number data with the idle one-touch registration memory (S4). When the user has ordered the registration of the telephone number data with the idle one-touch registration memory (S4: YES), the telephone number data which has been inputted for the new registration and additional information newly inputted by the user as needed (name, nickname, etc.) are registered with the idle one-touch registration memory as the one-touch data (S13), and thereafter process advances to the high call origination frequency process (S29) which will be described later.

Meanwhile, when the user has not ordered the registration of the telephone number data with the idle one-touch registration memory (S4: NO), a guidance message for inquiring of the user whether to copy (duplicate) the one-touch data already registered with the telephone code 30 designated by the user to the idle one-touch registration memory in the one-touch registration memory 15$a$ or not is displayed on the LCD 5 and thereafter whether the user seeing the guidance message has ordered the copying of the one-touch data to the idle one-touch registration memory or not is checked (S5). When the user has ordered the copying of the one-touch data to the idle one-touch registration memory (S5: YES), the one-touch data which has been registered with the telephone code 30 designated by the user is copied to the idle one-touch registration memory (S14). After the step S14 is finished, process advances to the step S2.

Meanwhile, if the user has not ordered the copying of the one-touch data to the idle one-touch registration memory (S5: NO), a guidance message for inquiring of the user whether to overwrite the one-touch data (registered with the telephone code 30 designated by the user) with the telephone number data to be newly registered or not is displayed on the LCD 5 and thereafter process determines whether the user seeing the guidance message has ordered the overwriting of the one-touch data with the telephone number data (S6). When the user has ordered the overwriting of the one-touch data with the telephone number data (S6: YES), process advances to the step S2.

Meanwhile, when the user has not ordered the overwriting of the one-touch data (registered with the telephone code 30 designated by the user) with the telephone number data (to be newly registered) (S6: NO), process advances to the high call origination frequency process (S29) which will be described later.

In the judgment of the step S3, when there exists no idle one-touch registration memory (S3: NO), process determines whether there exists one-touch data having low call origination frequency in the one-touch registration memory 15$a$ by referring to the call origination history table 14$b$ (S21).

In the step S21, history records in the call origination history table 14$b$ that have passed one month or more are deleted, telephone number data that do not reach a prescribed number of call origination (e.g. twice) are selected, and one-touch data having telephone number data of the lowest call origination frequency among the selected telephone number data is extracted.

When there exists one-touch data having low call origination frequency in the step S21 (S21: YES), process determines whether there exists an idle memory space in the telephone directory data memory 15$b$ with which no telephone number data has been registered (idle telephone directory data memory) (S7). When there exists idle telephone directory data memory (S7: YES), a guidance message for inquiring of the user whether to copy (duplicate) the one-touch data extracted in the step S21 to the idle telephone directory data memory or not is displayed on the LCD 5 and thereafter process determines whether the user seeing the guidance message has ordered the copying (duplication) of the one-touch data extracted in the step S21 to the idle telephone directory data memory (S22).

When the user has ordered the copying of the one-touch data (extracted in the step S21) to the idle telephone directory data memory (S22: YES), process determines whether data identical with the one-touch data extracted in the step S21 (one-touch data of low call origination frequency) already exists in the telephone directory data memory 15$b$ (S23).

When no data identical with the one-touch data of low call origination frequency exists in the telephone directory data memory 15$b$ (S23: NO), the one-touch data is copied to the idle telephone directory data memory (S24).

By the step S24, among one-touch data which have been registered with the one-touch registration memory 15$a$, one-touch data having call origination frequency lower than a prescribed call origination frequency (preferably, one-touch data of the lowest call origination frequency among them) are preferentially copied to the telephone directory data memory 15$b$. Therefore, the one-touch dialing function, which becomes more and more convenient by registering telephone number data of higher call origination frequency, can be utilized more effectively.

After the step S24, the display process is executed (S12). Subsequently, a guidance message for inquiring of the user whether to register the telephone number data (to be registered) with the telephone code 30 with which the one-touch data extracted in the step S21 has been registered or not is displayed on the LCD 5 and thereafter whether the user seeing the guidance message has ordered the registration of the telephone number data (to be registered) with the telephone code 30 (with which the one-touch data extracted in the step S21 has been registered) or not is checked (S25).

When the user has not ordered the registration of the telephone number data (S25: NO), a guidance message for inquiring of the user whether to copy the one-touch data already registered with the telephone code 30 designated by the user to the telephone code 30 corresponding to the one-touch data extracted in the step S21 or not is displayed on the LCD 5 and thereafter process determines whether the user seeing the guidance message has ordered the copying of the one-touch data (already registered with the telephone code 30 designated by the user) to the telephone code 30 (corresponding to the one-touch data extracted in the step S21) (S26).

When the user has ordered the copying of the one-touch data (S26: YES), the one-touch data already registered with the telephone code 30 designated by the user is copied to the telephone code 30 corresponding to the one-touch data extracted in the step S21 (S27). After the step S27, process advances to the step S2.

In the judgment of the step S25, when the user has ordered the registration of the telephone number data (to be registered) with the telephone code 30 with which the one-touch data extracted in the step S21 has been registered (S25: YES), the telephone number data to be registered and additional information newly inputted by the user as needed (name, nickname, etc.) are registered with the telephone code 30 with which the one-touch data extracted in the step S21 has been registered (S28), and there after the high call origination frequency process (S29) which will be described later is executed.

The process advances to the high call origination frequency process (S29) also in the following four cases:
(1) when no one-touch dial having low call origination frequency is found in the call origination history table 14$b$ in the judgment of the step S21 (S21: NO) and the judgment of the step S6 is "NO" (S6: NO);
(2) when there exists no idle telephone directory data memory in the judgment of the step S7 (S7: NO) and the judgment of the step S6 is "NO" (S6: NO);
(3) when the user has not ordered the copying of the one-touch data extracted in the step S21 to the idle telephone directory data memory in the judgment of the step S22 (S22: NO) and the judgment of the step S6 is "NO" (S6: NO)

(4) when the user has not ordered the copying of the one-touch data already registered with the telephone code 30 designated by the user to the telephone code 30 corresponding to the one-touch data extracted in the step S21 in the judgment of the step S26 (S26: NO) and the judgment of the step S6 is "NO" (S6: NO).

Also when data identical with the one-touch data of low call origination frequency already exists in the telephone directory data memory 15*b* in the judgment of the step S23 (S23: YES), the process advances to the high call origination frequency process (S29) which will be described below.

In the following, the high call origination frequency process (S29) will be explained in detail referring to a flowchart of FIG. 9. The high call origination frequency process is a process for allowing the user to move (copy) telephone directory data registered with the telephone directory data memory 15*b* having high call origination frequency to the one-touch registration memory 15*a* as needed. First, process determines whether there exists idle one-touch registration memory (S31). When there exists idle one-touch registration memory (S31: YES), process determines whether there exists telephone directory data of high call origination frequency by referring to the call origination history table 14*b* (S32).

In the step S32, history records in the call origination history table 14*b* that have passed one month or more are deleted, telephone number data that have reached a prescribed number of call origination (e.g. 10 times or more) are selected, and telephone directory data having telephone number data of the highest call origination frequency among the selected telephone number data is extracted.

When there exists telephone directory data having high call origination frequency in the step S32 (S32: YES), a guidance message for inquiring of the user whether to register the telephone directory data extracted in the step S32 with the idle one-touch registration memory or not is displayed on the LCD 5 and thereafter process determines whether the user seeing the guidance message has ordered the registration of the telephone directory data (extracted in the step S32) with the idle one-touch registration memory (S33).

By the step S33, if any telephone directory data registered with the telephone directory data memory 15*b* has a prescribed call origination frequency or more, whether to move the telephone directory data to the one-touch registration memory 15*a* or not is inquired of the user. When the user desires, the telephone directory data of high call origination frequency can be associated and registered with a one-touch dialing key 4*a* as one-touch data. Since there are cases where the user does not need the registration as one-touch data, the one-touch dialing function, which becomes more and more convenient by registering telephone number data of higher call origination frequency, can be utilized effectively according to the requirements of the user.

In the judgment of the step S33, when the user has ordered the registration of the telephone directory data (extracted in the step S32) with the idle one-touch registration memory (S33: YES), the telephone directory data extracted in the step S32 is copied to the idle one-touch registration memory while deleting the telephone directory data from the telephone directory data memory 15*b* (S34), and the high call origination frequency process (S29) is ended.

The high call origination frequency process (S29) is ended also in the following three cases:

(1) when there exists no idle one-touch registration memory in the judgment of the step S31 (S31: NO);

(2) when there exists no telephone directory data having high call origination frequency in the judgment of the step S32 (S32: NO); and (3) when the user has not ordered the registration of the telephone directory data extracted in the step S32 with the idle one-touch registration memory (that is, when the user ordered not to register the telephone directory data extracted in the step S32 with the idle one-touch registration memory) (S33: NO).

Returning to FIGS. 8A and 8B, after the high call origination frequency process (S29) is finished, the one-touch registration process is ended.

As described above, by the facsimile machine 1 in accordance with the second embodiment of the present invention, when one-touch data registered with the one-touch registration memory 15*a* is copied to the telephone directory data memory 15*b*, one-touch data having low call origination frequency below a prescribed call origination frequency is preferentially copied to the telephone directory data memory 15*b*. Further, by the high call origination frequency process, telephone directory data having high call origination frequency can be moved from the telephone directory data memory 15*b* to the one-touch registration memory 15*a* as one-touch data. Therefore, one-touch data having high call origination frequency are preferentially held in the one-touch registration memory 15*a*, by which the user is allowed to make effective use of the one-touch dialing function as a function offering enhanced convenience for telephone numbers of higher call origination frequency.

While the present invention has been described with reference to the particular illustrative embodiments, it is not to be restricted by those embodiments but only by the appended claims. For example, while the above embodiments has been described taking the facsimile machine 1 as an example of a communication device in accordance with the present invention, the present invention is widely applicable to various communication devices having the call origination function and the one-touch dialing function. It is to be appreciated that those skilled in the art can change or modify the embodiments without departing from the scope of the present invention.

The present disclosure relates to the subject matter contained in Japanese Patent Application No. 2003-342209, filed on Sep. 30, 2003, which is expressly incorporated herein by reference in its entirety.

What is claimed is:

1. A communication device that makes a call origination in accordance with a predetermined operation, comprising:
  a one-touch dial storage that stores telephone numbers in association with one-touch dial keys;
  a telephone directory data storage that stores telephone numbers which are not associated with one-touch dial keys; and
  a copying system that, when a new telephone number that has not been stored in the telephone directory data storage is to be stored in the one-touch dial storage, copies at least the telephone number stored in the one-touch dial storage into the telephone directory data storage.

2. The communication device according to claim 1, wherein, when the new telephone number is to be stored, in association with one of the one-touch dial keys, in the one-touch dial storage but all the one-touch dial keys have associated telephone numbers, the copying system copies one of the telephone numbers associated with the one-touch dial keys to the telephone directory data storage.

3. The communication device according to claim 1, wherein the new telephone number is registered to be associated with the one-touch dial key of which a previously associated telephone number is copied to the telephone directory data storage.

4. A communication device that makes a call origination in accordance with a predetermined operation, comprising:
a one-touch dial storage that stores telephone numbers in association with one-touch dial keys;
a telephone directory data storage that stores telephone numbers which are not associated with one-touch dial keys; and
a copying system that copies at least the telephone number stored in the one-touch dial storage into the telephone directory data storage,
wherein, when the new telephone number is to be stored, in association with one of the one-touch dial keys, in the one-touch dial storage but all the one-touch dial keys have associated telephone numbers, the copying system copies one of the telephone numbers associated with the one-touch dial keys to the telephone directory data storage,
the communication device further comprising:
a first memory including the one-touch dial storage and the telephone directory data storage;
a second memory that stores call origination history data including telephone numbers having been originated; and
a call origination frequency detecting system that detects a frequency for each telephone number based on the call origination history stored in the second memory,
wherein the copying system copies the telephone number whose call origination frequency is less than a predetermined value prior to the other telephone numbers.

5. The communication device according to claim 4, wherein the copying system copies the telephone number having the lowest call origination frequency prior to the other telephone numbers.

6. The communication device according to claim 4, further comprising a requesting system that requests a user to determine whether a telephone number which is stored in the telephone directory data storage and whose call origination frequency is greater than the predetermined value is to be copied to the one-touch dial storage.

7. A communication device that makes a call origination in accordance with a predetermined operation, comprising:
a one-touch dial storage that stores telephone numbers in association with one-touch dial keys;
a telephone directory data storage that stores telephone numbers which are not associated with one-touch dial keys;
a copying system that copies at least the telephone number stored in the one-touch dial storage into the telephone directory data storage;
a designating system that allows a user to designate a one-touch dial key, a telephone number to be newly registered being stored in the one-touch dial storage in association with the designated one-touch dial key; and
an association changing system that makes the telephone number associated with the designated one-touch dial key be associated with an idle one-touch dial key with which no telephone number is associated if the designated one-touch key already has an associated telephone number,
wherein the copying system does not copy the telephone number associated with the designated one-touch dial key when the telephone number is changed to be associated with the idle one-touch dial key.

8. The communication device according to claim 7, wherein, if there is no idle one-touch dial key, the copying system copies the telephone number associated with the designated one-touch dial key in the telephone directory data storage, the new telephone number being registered in association with the designated one-touch dial key.

9. The communication device according to claim 7, further comprising:
a first determination system that allows a user to determine whether the telephone number associated with the designated one-touch key is to be changed;
a second determination system that allows the user to determine whether the new telephone number overwrites the telephone number associated with the designated one-touch key,
wherein the copying system copies the telephone number associated with the designated one-touch key to the telephone directory data storage if the new telephone number overwrites the telephone number associated with the designated one-touch dial key.

10. The communication device according to claim 7, wherein, when there is no idle one-touch key, the copying system selects one of the telephone numbers associated with the one-touch keys and copies the selected telephone number in the telephone directory data storage.

11. The communication device according to claim 10, further comprising:
a first memory including the one-touch dial storage and the telephone directory data storage;
a second memory that stores call origination history data including telephone numbers having been originated; and
a call origination frequency detecting system that detects a frequency for each telephone number based on the call origination history stored in the second memory,
wherein the copying system copies the telephone number whose call origination frequency is less than a predetermined value prior to the other telephone numbers.

12. The communication device according to claim 11, wherein the copying system copies the telephone number having the lowest call origination frequency prior to the other telephone numbers.

13. The communication device according to claim 10, wherein the new telephone number is registered to be associated with the one-touch dial key of which the previously associated telephone number is copied to the telephone directory data storage.

14. The communication device according to claim 10, wherein the telephone number associated with the designated one-touch dial key is re-registered to be associated with the one-touch dial key of which the previously associated telephone number is copied to the telephone directory data storage, the new telephone number being registered to be associated with the designated one-touch dial key.

15. A communication device that makes a call origination in accordance with a predetermined operation, comprising:
a one-touch dial storage that stores telephone numbers in association with one-touch dial keys;

a telephone directory data storage that stores telephone numbers which are not associated with one-touch dial keys; and a copying system that copies at least the telephone number stored in the one-touch dial storage into the telephone directory data storage, wherein a telephone number previously associated with a designated one-touch dial key is re-registered to be associated with a one-touch dial key of which the previously associated telephone number is copied to the telephone directory data storage, a new telephone number being registered to be associated with the designated one-touch dial key.

16. A communication device that makes a call origination in accordance with a predetermined operation, comprising:
   a one-touch dial storage that stores telephone numbers in association with one-touch dial keys;
   a telephone directory data storage that stores telephone numbers which are not associated with one-touch dial keys;
   a copying system that copies at least the telephone number stored in the one-touch dial storage into the telephone directory data storage;
   a sorting system that sorts the telephone directory data stored in the telephone directory data storage in accordance with a predetermined sorting condition; and
   a displaying system that displays the telephone directory data,
   wherein the sorting system sorts the telephone directory data after the copying system copies the telephone number to the telephone directory data, and
   wherein the displaying system displays telephone number as copied and telephone numbers before and after the telephone number as copied in a sorted order.

17. A communication device that makes a call origination in accordance with a predetermined operation, comprising:
   a one-touch dial storage that stores telephone numbers in association with one-touch dial keys;
   a designating system that allows a user to designate a one-touch dial key, a telephone number to be newly registered being stored in the one-touch dial storage in association with the designated one-touch dial key; and
   an association changing system that makes the telephone number associated with the designated one-touch dial key be associated with another one-touch dial key if the designated one-touch key already has an associated telephone number.

18. A communication device that makes a call origination in accordance with a predetermined operation, comprising:
   a one-touch dial storage that stores telephone numbers in association with one-touch dial keys;
   a telephone directory data storage that stores telephone numbers which are not associated with one-touch dial keys;
   a designating system that allows a user to designate a one-touch dial key, a telephone number to be newly registered being stored in the one-touch dial storage in association with the designated one-touch dial key; and
   a copying system that copies the telephone number associated with the designated one-touch dial key and is stored in the one-touch dial storage into one of the one-touch dial storage in association with another one-touch dial key and the telephone directory data storage.

19. A computer program product comprising computer readable instructions that cause a computer to function as a communication device that makes a call origination in accordance with a predetermined operation, the communication device realizing:
   a one-touch dial storage that stores telephone numbers in association with one-touch dial keys;
   a telephone directory data storage that stores telephone numbers which are not associated with one-touch dial keys; and
   a copying system that, when a new telephone number that has not been stored in the telephone directory data storage is to be stored in the one-touch dial storage, copies at least the telephone number stored in the one-touch dial storage into the telephone directory data storage.

20. A computer program product comprising computer readable instructions that cause a computer to function as a communication device that makes a call origination in accordance with a predetermined operation, the communication device realizing:
   a one-touch dial storage that stores telephone numbers in association with one-touch dial keys;
   a designating system that allows a user to designate a one-touch dial key, a telephone number to be newly registered being stored in the one-touch dial storage in association with the designated one-touch dial key; and
   an association changing system that makes the telephone number associated with the designated one-touch dial key be associated with another one-touch dial key if the designated one-touch key already has an associated telephone number.

21. A computer program product comprising computer readable instructions that cause a computer to function as a communication device that makes a call origination in accordance with a predetermined operation, the communication device realizing:
   a one-touch dial storage that stores telephone numbers in association with one-touch dial keys;
   a telephone directory data storage that stores telephone numbers which are not associated with one-touch dial keys;
   a designating system that allows a user to designate a one-touch dial key, a telephone number to be newly registered being stored in the one-touch dial storage in association with the designated one-touch dial key; and
   a copying system that copies the telephone number associated with the designated one-touch dial key and is stored in the one-touch dial storage into one of the one-touch dial storage in association with another one-touch dial key and the telephone directory data storage.

* * * * *